United States Patent Office 2,935,339
Patented May 3, 1960

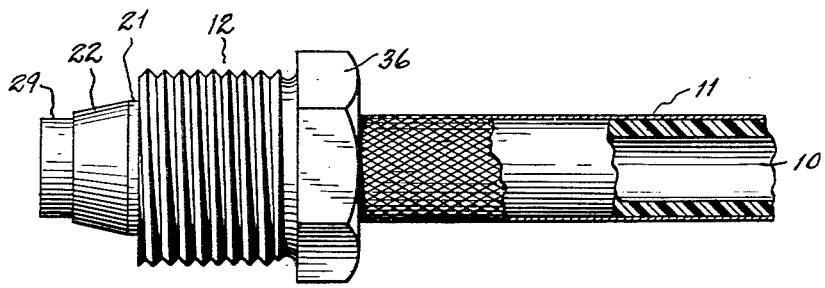
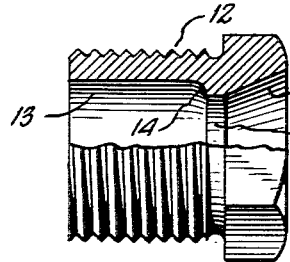
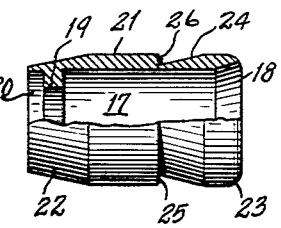
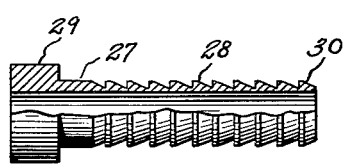
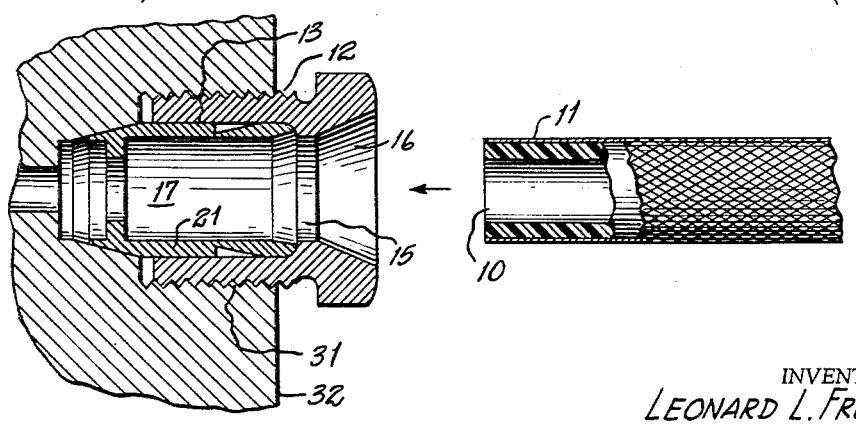

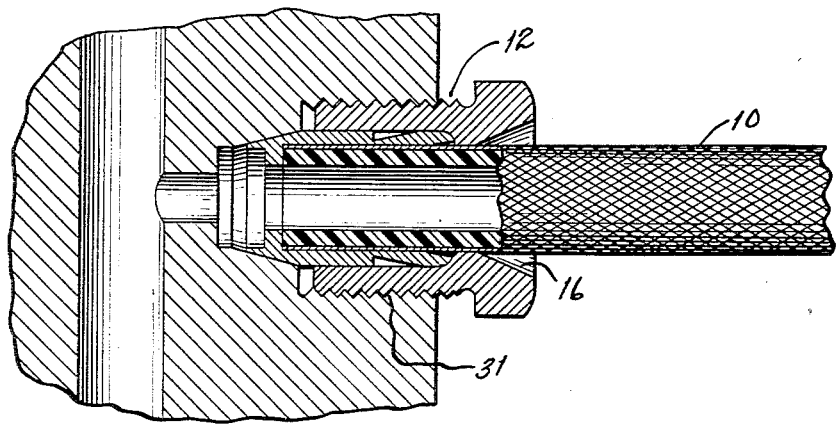
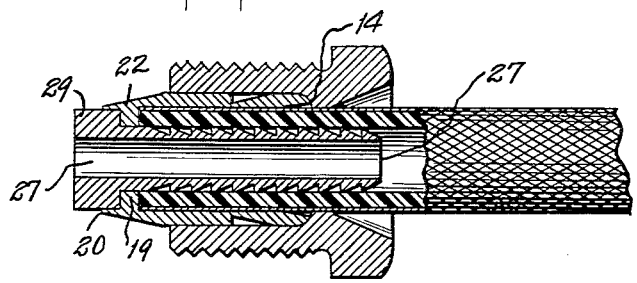
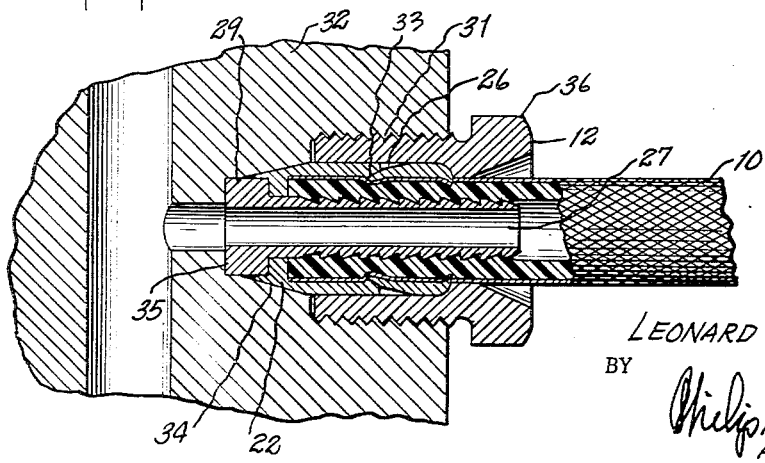

2,935,339

READILY APPLICABLE, SHOCK PROOF END FITTING FOR HEAVY DUTY FLEXIBLE TUBING

Leonard L. Frederick, Whippany, N.J., assignor to McKiernan-Terry Corporation, Harrison, N.J., a corporation of New Jersey Application March 31, 1958, Serial No. 724,989

1 Claim. (Cl. 285—4)

The invention herein disclosed relates to fittings for connecting the ends of flexible tubing to the machines or structures with which such tubing is used.

Particularly the invention is concerned with the use of such tubing with pile hammers and like machines where vibration is severe and where high pressure and temperature conditions must be met.

The flexible tube connections heretofore used for supplying fuel and oil to heavy reciprocating machines of the pile hammer type have been unable to stand the constant shock and vibration of these machines and it is an object of this invention to provide end fittings for such flexible tubing which will be shock proof and which will be able to meet all the heavy duty requirements, including high temperatures and pressures to which they may be subjected.

An important object of the invention is to provide such fittings in a form such that they may be applied at the point of use, thus to enable the cutting of the length of tube to meet requirements and connection of that tube direct to the machine, in the field, avoiding need of shipping machines or parts back to the factory or source of supply.

To withstand high temperature and pressure conditions special forms of plastic tubing have been used but these have introduced problems in the securing of such tubing. These plastics have a slick or slippery surface characteristic making it difficult to grip and hold them by ordinary means.

The present invention has as an important object to provide satisfactory and reliable means for firmly securing and holding the plastic tubing, without injuring the tubing and further without locking the screw portion of the fitting against the rotary movement required to secure the fitting in place.

Other important objects of the invention are to provide the end fitting in a simple, quickly and easily assembled form and one which can be put together without requiring use of other than simple tools, such as a cutter for severing the tube to proper length and a wrench for turning the nut element of the fitting into its seat.

A further object of the invention is to provide an end fitting which will secure and support the flexible tube in a manner to avoid any strain that might induce fracture or breaking of the tube.

The foregoing and other desirable objects are attained in this invention by novel features of construction, combinations and relations of parts as above indicated and as hereinafter set forth more in detail.

The drawings accompanying and forming part of this specification illustrate a present commercial embodiment of the invention. Structure however may be modified and changed as regards the immediate illustration, all within the true intents and scope of the invention as hereinafter defined and claimed.

Fig. 1 in the drawing is a side elevation view of the fitting on the end of a length of armored plastic tubing, the latter partly broken away and in section.

Figs. 2, 3, and 4 are broken part sectional views of the three components of the fitting, generally identified as the nut, the ferrule and the insert.

Fig. 5 is a broken sectional view illustrating a first stage in the assembly of the fitting, showing the nut with the ferrule inside it screwed in place, usually in the seat in which it is to be mounted in the machine and the end of the tubing positioned to be advanced through the guide funnel outer end portion of the nut, into position within the ferrule, at that time loosely held in the nut.

Fig. 6 is a broken sectional view illustrating completion of the first assembly stage by forcing the end of the tube fully into position against the stop flange at the inner end of the ferrule.

Fig. 7 is a broken sectional view of the fitting removed from the screw seat in the supporting structure and showing the third element, the insert forced into position in the end of the tubing and into seated engagement in the inner end of the ferrule.

Fig. 8 is a broken sectional view showing the fully assembled fitting in final position, with the nut turned fully into its seat after fracturing the ferrule to accomplish wedging of the ferrule parts into holding engagement with the tube.

In the several views a section of flexible plastic tubing suitable to meet high temperature and high pressure conditions is indicated at 10. This may be what is known as "Teflon," armored with metallic braid 11.

The nut element of the fitting is designated 12 and this is of special construction, having a deep smooth cylindrical chamber 13 in the inner end, terminating in a rounded shoulder 14 at the back or outer end of the same and open to the outer end of the nut by a circular passage 15 of approximately the diameter of the tube.

A further important special feature of the nut is the inwardly tapered funnel shaped entrance 16 in the outer end of the nut leading inwardly to the passage 15.

This beveled opening has several important functions. It serves as a guide for entering the end of the tubing into the nut and into the ferrule and as a means for contracting the braid armoring the tubing and which may have been frayed more or less in cutting the tubing to length. This funnel in the outer end of the nut further, in the final relation of parts, allows freedom for bending of the tubing without cramping or subjecting the tubing to any bending strains.

The ferrule constituting the second element of the combination is shown in Fig. 3 as having a smooth cylindrical bore 17 to receive the end of the tube, with a beveled entrance way 18 at the outer end and an annular stop flange 19 at the inner end. At the other side of this flange the ferrule has an annular seat 20 for support of the third element, the insert.

Externally the ferrule has a smooth cylindrical intermediate portion 21 from which there extends forwardly an inwardly tapered conical portion 22.

The outer end of the ferrule is rounded at 23 to more or less match the rounded shoulder 14 in the nut and this outer end portion of the ferrule is tapered inwardly at 24 down to an abrupt annular shoulder 25 at the outer end of the cylindrical portion 21.

The inward taper 24 and shoulder 25 thin the wall of the ferrule sufficiently to establish an incipient line of cleavage at the base of the shoulder at 26 which with endwise pressure on the ferrule will cause the two end portions of the ferrule to break away at this point and cause them to exert wedging pressure on the tubing.

The third member of the combination, the insert, is shown in Fig. 4 as comprising an elongated sleeve 27 of a size to closely fit in the tube, having a saw-tooth ridged external surface 28 to mechanically grip the tube and an annular flange or head 29 at the inner end to set in the cavity 20 in the inner end of the ferrule, in abutment with the flange 19. The inner end of the insert sleeve is shown as beveled at 30 to facilitate entry into the tube.

The fitting is assembled by forcing the end of the tube through the conical throat 16 of the sleeve or tubular nut 12 and fully into the ferrule, against the stop flange 19. Then the insert sleeve is forced in through the inner end of the ferrule and into the open end of the tube. After this, the sleeve nut is actuated to apply longitudinal pressure sufficient to fracture the ferrule at the weakened intermediate line 26 thus to separate this sleeve into two opposed end sections, one of which will operate as a wedge to crimp and clamp the other section down on the wall of the flexible tube.

These operations can be performed by hand and by using the screw seat with which the sleeve nut is to be engaged as a support and holder for the assembly operations.

To carry out these effects the ferrule, as identified at 21, Fig. 5, may first be inserted in the socket 13 in sleeve nut 12 and the nut then be turned into firmly supported engagement in its screw seat 31 in the support 32, which may be that part of the machine with which the flexible tubing is to be used. In this position the ferrule is supported in the outer screw sleeve element with the conical entrance 16 to the latter providing a guide for directing the end of the flexible tube into this sleeve, and past the shoulder 15 into the bore 17 of the ferrule. The conical entrance in this relation acts as a funnel to center and possibly contract the tube and particularly the armor covering so that it will enter and slide freely through the nut and ferrule into engagement with the stop flange 19.

This condition of assemblage is indicated in Fig. 6, with the tubing fully entered in the sleeve nut and ferrule.

Then after removal of the fitting from the supporting screw seat 31 the internal insert sleeve 27 may be applied by forcing it in through the inner open end of the ferrule into fully seated engagement in the tube with the head flange 29 of the same seated in the cavity 20 in the end of the ferrule, against stop flange 19 as shown in Fig. 7.

The insert sleeve may have a press fit in the tube, such that it may be pushed into place by hand pressure. In this condition the parts are held firmly assembled with the insert locked to the tube by the ridges or teeth 28 and the tube expanded sufficiently to hold the ferrule against turning, while the sleeve nut is free to turn about the ferrule.

Fig. 8 illustrates the final condition of the parts after endwise pressure has been applied to sever the inner and outer end sections of the ferrule at 26 and to cause the inner conical end of the outer section to operate as a wedge 33 forced into the broken end of the forward section and into positive holding engagement with the flexible tube.

This final closing of the ferrule down on the tubing may be accomplished, as indicated in Fig. 8, simply by entering the fitting in the screw socket 31 with which it is to be used and turning the nut sleeve in tight enough to crack the ferrule into the two separated parts with one wedged into the end of the other and thereby clamped solidly on the tubing.

The foregoing thus makes it possible to apply the fitting and secure the flexible tube in place with only a tool to cut the tubing to proper length and a wrench to turn the sleeve nut in the socket in which it is to be used. This makes the invention particularly practical and valuable where field repairs are likely to become necessary, where, for instance, pile hammers are subject to rough usage such as might break off the fuel and lubricating lines present on such machines.

In severing the ferrule and setting it down into holding engagement on the flexible tubing pressure is applied on the tubing at both ends as well as at the intermediate clamping position.

This will be appreciated by reference to Fig. 8 where it will be seen that the screw seat for the fitting has a conical inner wall 34 against which the conical end portion 22 of the ferrule may abut and a stop shoulder 35 engageable by the head flange 29 of the insert tending to clamp the ferrule down on the inner end of the tubing, while the rounded abutment shoulder 14 of the screw sleeve tends to close the outer end of the ferrule down over the tubing and the latter all the more so after the weakened end section has been broken away from the forward section.

All this clamping action furthermore is accomplished without impairing the rotatability of the sleeve nut over the tubing. The endwise pressure applied by this nut thrusts the ferrule and insert into firmly held engagement in the conical seat 34 at the inner end of the screw socket and sufficiently to resist turning when the nut is turned to set it into final position in the screw seat. This is particularly important making it unnecessary to supply any other special means for permitting rotation of the nut about the tube in screwing or unscrewing the fitting to or from the supporting structure.

With this invention the outer end portion of the ferrule surrounding the flexible tube is automatically sheared in the act of securing the fitting in place and the metal of the detached portion of the ferrule is furled inwardly and made to bite into and to interlockingly grip the wall of the tube. The surface of the tube in this case is provided by the braid covering which is forced into the plastic wall of the tube, effecting positive holding of the tube even with plastic of more or less soapy or slick characteristics.

By tapering the outer end portion of the ferrule at 24 down to the base of the annular shoulder 25 the wall thickness is reduced and so weakened as to fracture under end pressure applied by the nut. This fracture leaves rough edges on the separated parts which are the more effective in securing the parts in the final assembled relation and the abrupt shoulder on the end of the forward section acts as a guide for directing and furling the thinned edge of the back section into gripping engagement with the tube.

The nut element is essentially an externally screw threaded sleeve having a nut head 36 at the outer end of it so that it may be handled as a nut by an ordinary wrench.

While of particular value for oil and fuel lines on pile hammers and other such machines because of its shock-proof characteristics the invention has many other uses. The sleeve nut in addition to its functions of locking the ferrule on the tube and securing these in combined relation to the supporting structure, serves the further purpose of supporting the tube where it issues from the fitting at an easy bending angle such as to avoid strain or breaking of the tube. The conical funnel mouth of the screw sleeve prevents any acute bending of the tube and, as shown in Fig. 8, the insert sleeve 27 may be long enough to extend at least partly within this funnel mouth portion of the nut forming sleeve.

The invention makes it possible to quickly effect repairs or replacements at the site of operations and this by simply cutting tubing to proper length and after assembly of just the three parts, screwing the fitting in place, the latter action automatically securing the tubing without preventing rotation of the nut about the tubing. The fitting consists of but the few parts shown and a fluid-tight shock-proof seal is accomplished without use of O-rings or other forms of packing.

Final instalaltion of the fitting is accomplished without twisting or straining the tube because of the clearance for the tube in the funnel entry passage and because of the holding of the tube against rotation in the conical socket at the inner end of the screw seat and whereby the tube is held against rotation while the nut is being screwed into or out of its seat.

What is claimed is:

A readily applicable shock-proof end fitting for heavy duty flexible armored plastic tubing comprising the combination of a rigid support having a screw socket, a coaxially extended tapered conical socket at the inner end of said screw socket and a stop shoulder at the inner end of said conical socket, flexible armored tubing, a cylindrical ferrule surrounding the end portion of said tubing and having an internal annular flange at the inner end in abutment with the end of said tubing, said ferrule having an externally conical inner end portion tapered on an incline matching and holding said ferrule against turning in the conical socket, said ferrule having an internal annular seat in the inner end of the same, the external outer end portion of said ferrule being tapered inwardly to an abrupt annular shoulder providing a reduced weakened wall portion and the extreme outer end of said ferrule being rounded and beveled internally to form an entrance end, a supporting sleeve within that part of the tubing surrounded by said ferrule having an annular head at the inner end of the same disposed in said annular seat in the inner end of the ferrule and engaged with said stop shoulder in said rigid support, said supporting sleeve extending through said internal annular flange in the ferrule into gripping and supporting engagement with the inner wall of said flexible armored tubing, and an externally screw threaded sleeve nut seated in said screw socket over said ferrule, said sleeve nut having a funnel shaped opening in the outer end thereof for entering flexible armored tubing through said nut and through said beveled entrance end of the ferrule into position against said annular flange of the ferrule, said nut having a smooth cylindrical socket in the inner end portion of the same rotatably engaged over the cylindrical portion of said ferrule and provided with an internal annular rounded shoulder adjoining the inner end of said funnel shaped opening in engagement with the rounded outer end of said ferrule for applying thrust to force the ferrule into abutting engagement with the head of said supporting sleeve and the conical inner end portion of the ferrule into stationary held engagement with said conical socket and to fracture the weakened outer end portion of the ferrule from the inner portion of the ferrule and to wedge the separated tapered portion of the ferrule into the inner portion from which it is separated and into interlocked engagement with that portion of the flexible tubing which is internally gripped by said supporting sleeve, said supporting sleeve extending outwardly to a position within said funnel shaped opening portion of said sleeve nut to internally brace and support the tubing where it issues from the outer portion of the nut.

References Cited in the file of this patent

UNITED STATES PATENTS

| | | |
|---|---|---|
| 1,812,916 | Zerk | July 7, 1931 |
| 1,883,283 | Zerk | Oct. 18, 1932 |
| 1,888,338 | Weatherhead | Nov. 22, 1932 |
| 1,988,600 | Maclachlan | Jan. 22, 1935 |
| 2,311,663 | Hunziker | Feb. 23, 1943 |
| 2,388,992 | Pape | Nov. 13, 1945 |
| 2,463,707 | Matousek | Mar. 8, 1949 |

FOREIGN PATENTS

| | | |
|---|---|---|
| 1,052,094 | France | Sept. 23, 1953 |
| 1,075,106 | France | Apr. 14, 1954 |
| 925,028 | Germany | Feb. 10, 1955 |